Sept. 1, 1942.   C. G. GERHOLD ET AL   2,294,547
TREATMENT OF HYDROCARBONS
Filed Oct. 10, 1938
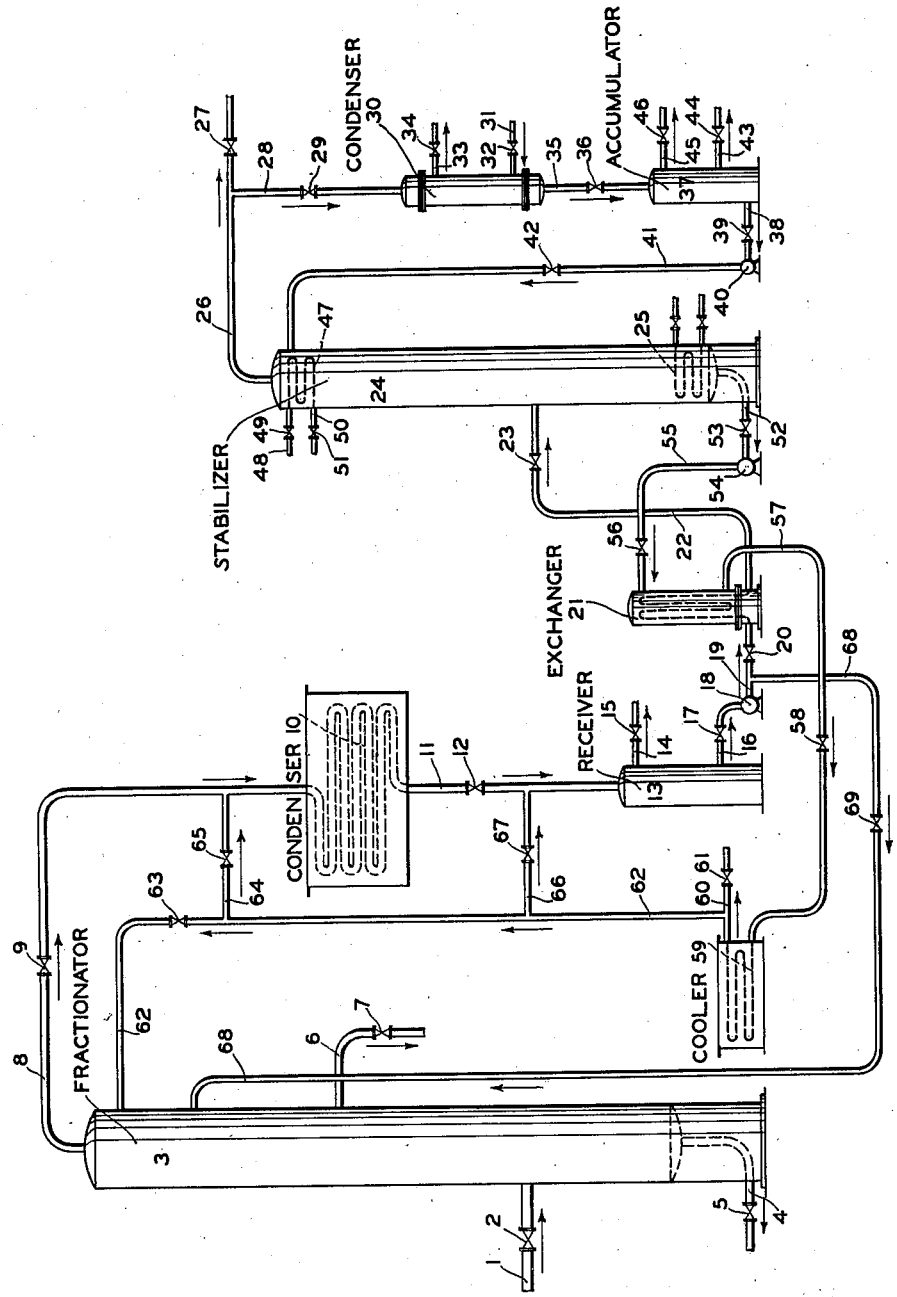
INVENTORS
CLARENCE G. GERHOLD
BERNARD J. FLOCK
BY Lee J Gary
ATTORNEY Patented Sept. 1, 1942

2,294,547

UNITED STATES PATENT OFFICE 2,294,547

TREATMENT OF HYDROCARBONS

Clarence G. Gerhold and Bernard J. Flock, Chicago, Ill., assignors to Universal Oil Products Company, Chicago, Ill., a corporation of Delaware Application October 10, 1938, Serial No. 234,181

4 Claims. (Cl. 196—11)

This invention particularly refers to an improved process and apparatus for separating low-boiling vaporous products resulting from the pyrolytic conversion of hydrocarbon oils into stabilized distillate, such as gasoline of the desired vapor pressure, relatively clean gases substantially free of 4-carbon atom hydrocarbons, and rich normally gaseous products containing a high percentage of readily polymerizable olefins, such as propene and butenes.

It is now common practice in modern cracking operations to substantially condense the fractionated vaporous conversion products of the process, which consist predominantly of gasoline boiling range materials and normally gaseous products, separate the resulting distillate, which contains substantial quantities of dissolved gases, from the remaining uncondensed gases, stabilize said distillate to reduce its vapor pressure to the desired degree by liberating regulated quantities of the entrained normally gaseous products therefrom and separately recover the stabilized distillate and liberated gases. It is also common practice to return regulated quantities of the unstabilized distillate, resulting from said condensation of the fractionated vapors, to the fractionating step as a cooling and refluxing medium.

With the advent of efficient processes for the polymerization of normally gaseous olefins, such as propene and butenes, which are now being rapidly adopted in the oil refining industry, the propene and butene fractions produced, incidental to the production of high yields of gasoline by the pyrolysis of hydrocarbon oils, have become valuable as charging stock for polymerization processes in which they are converted into additional yields of high antiknock gasoline. The polymerization stock ordinarily consists of the normally gaseous products liberated from the cracked distillate by stabilization of the latter, in the manner above described, since these gases normally contain a high proportion of propene and butenes. However, in an operation such as above outlined, a substantial quantity of the propene and butene fractions will remain in the gases separated from the unstabilized distillate following said condensation of the fractionated vapors. Therefore, in order not to waste these valuable readily polymerizable gases and in order to prevent the inclusion of excessive quantities of lower boiling gases in a polymerization stock, it is necessary to recover the propene-butene fractions of said uncondensed gases by fractionation, absorption or the like. This additional step increases the cost of recovering the desired polymerization stock out of proportion with the amount of such stock thus recovered as compared with that obtained from the stabilization step.

This invention provides am improved cooperative combination of fractionating, condensing and stabilizing steps, whereby substantially all of the propene-butene fractions are concentrated in the distillate subjected to said stabilization, while a major portion of the lower boiling gases are separated from said distillate following the condensation step and prior to stabilization of the distillate. By use of the improved process and apparatus of the invention, substantially all of the desired high-boiling gases produced by the cracking operation, in excess of those required for retention in the stabilized distillate to give it the desired vapor pressure, are recovered in the overhead vaporous products of the stabilization step. Furthermore, since a major portion of the lower boiling gases, undesired as polymerization stock, are previously separated from the distillate, the vaporous product of the polymerization step contains a high percentage of the readily polymerizable olefins and is satisfactory as polymerization stock without further separation of its components.

One specific embodiment of the process of the invention comprises fractionating vaporous products, resulting from the pyrolytic conversion of hydrocarbon oil, to separate their components boiling within the range of the desired light distillate product and normally gaseous products from their higher boiling components, subjecting the fractionated vapors, which consist of said distillate fractions and gases, to condensation, separating the resulting distillate and uncondensed gases, removing the latter from the system, stabilizing said distillate to the desired vapor pressure by liberating regulated quantities of entrained normally gaseous products therefrom, recovering the latter, cooling and returning regulated quantities of the stabilized distillate to the fractionating step wherein it is intimately contacted with the vapors and gases undergoing fractionation, and serves as a cooling and refluxing medium and wherein it is revaporized, the revaporized distillate being subsequently condensed by said condensation step and thence returned to the stabilization step together with the additional quantity of desirable high-boiling gases which it absorbs, and recovering the remaining portion of said stabilized distillate.

We have found that, in the improved operation above outlined, the stabilized distillate returned to the fractionating step acts as a selective absorbent for the desired high-boiling gases and serves as a means of concentrating substantially all of the propene-butene fractions in the distillate supplied to the stabilization step. It has a better absorptive capacity than the unstabilized distillate, since it is of substantially lower vapor pressure and is not saturated with gases. It has a selective affinity for the desired high-boiling gases due to the fact that its lower boiling fractions are relatively close to the heavy gases in boiling characteristics. Therefore, it not only serves to concentrate the desired high-boiling gases in the distillate, but since the recirculated distillate becomes substantially saturated with the heavier gases, a greater proportion of the lighter gases are separated from the unstabilized distillate following said condensation of the latter and, therefore, are not supplied to the stabilization step. This results in the polymerization stock recovered from the stabilization step containing not only a greater amount, but also a higher percentage of readily polymerizable olefins.

Although, in the above outlined specific embodiment of the invention we have specified the return of stabilized distillate to the fractionator, its return to this particular point in the system is not essential, since it will also function as an absorption medium for the desired high-boiling gases by commingling the same therewith at any stage in the system prior to the separation of unstabilized distillate from the low boiling gases. It is, however, ordinarily preferable to return the stabilized distillate to the upper portion of the fractionator, since with this method of operation, in addition to serving as an absorption medium, it serves as a means of cooling and assisting fractionation of the vapors.

The accompanying diagrammatic drawing illustrates one specific form of apparatus embodying the features of the invention in which the process of the invention may be conducted:

Referring to the drawing, hot vaporous products resulting from the pyrolytic conversion of hydrocarbon oils are supplied through line 1 and valve 2 to fractionator 3 wherein their components boiling above the range of the desired final light distillate product, such as gasoline, for example, are condensed as reflux condensate.

The total reflux condensate formed in fractionator 3 may be removed from the lower portion of this zone through line 4 and valve 5 and may be passed to cooling and storage or returned by well known means, not illustrated, to further cracking in the same system from which said vaporous products are derived or in a separate cracking system. The invention also contemplates the separate recovery of any desired number of selected fractions of the reflux condensate from fractionator 3 and, by way of illustration, line 6 and valve 7 are shown in the drawing through which a selected relatively low-boiling fraction of the reflux condensate may be removed from the fractionator to be supplied to cooling and storage or to further cracking or elsewhere, as desired, by well known means, not illustrated.

Fractionated vapors of the desired end-boiling point which may, for example, consist essentially of materials boiling within the range of gasoline and normally gaseous products, are directed from the upper portion of fractionator 3 through line 8 and valve 9 to condenser 10 wherefrom the resulting distillate and uncondensed gases are directed through line 11 and valve 12 to collection and separation in receiver 13. That portion of the uncondensed gases which is not dissolved in the distillate collected in receiver 13 is released therefrom through line 14 and valve 15. The distillate collected in receiver 13, which contains a substantial quantity of dissolved normally gaseous products which, in accordance with the provisions of the invention, will consist principally of high-boiling gases such as propene, butene and the corresponding paraffin hydrocarbons, is directed from receiver 13 through line 16 and valve 17 to pump 18 by means of which it is supplied through line 19, valve 20, heat exchanger 21, line 22 and valve 23 to stabilizer 24.

The purpose of heat exchanger 21 is to reheat the distillate sufficiently to effect substantial vaporization thereof in the stabilizer and, in the particular case here illustrated, this reheating of the distillate is accomplished by passing the same in indirect heat exchange with the relatively hot reboiled and stabilized distillate from stabilizer 24. However, the invention is not limited to this particular heat exchange step and the distillate may be heated to the desired vaporizing temperature in any well known manner, not illustrated, either by heat recovered from within the system or derived from an external source and the required heat may be supplied to the distillate either within or external to stabilizer 24 or partially in both manners.

Any conventional form of stabilizing equipment may be utilized and, in the particular case here illustrated, reboiling of the non-vaporous distillate collected within the lower portion of the stabilizer is accomplished by passing a suitable heating medium through closed coil 25 provided in the lower portion of the stabilizing column. This reboiling may also be accomplished in any other well known manner, not illustrated, either within or external to the stabilizing column.

The excess of normally gaseous components of the distillate supplied to stabilizer 24, over those required to produce a distillate of the desired vapor pressure, are liberated in the stabilizer and are removed from the upper portion of this zone through line 26. They may be supplied through valve 27 in line 26 directly to a suitable polymerization process or to storage or elsewhere, as desired, or they may be directed, all or in part, through line 28 and valve 29 to condenser 30 wherein they pass in indirect heat exchange with a suitable cooling medium recirculated through this zone by means of lines 31 and 33 and the respective valves 32 and 34. The resulting condensed and uncondensed gases are directed from condenser 30 through line 35 and valve 36 to collection in accumulator 37, wherefrom regulated quantities of the condensate are returned by means of line 38, valve 39, pump 40, line 41 and valve 42 to the upper portion of stabilizer 24, wherein they serve as a cooling and refluxing medium. When the last described method of operation is employed, any excess condensate recovered in accumulator 37, over that required as a cooling and refluxing medium in stabilizer 24, is withdrawn from the accumulator through line 43 and valve 44 and may, when desired, comprise the polymerization stock. In such cases, the uncondensed gases may be removed from accumulator 37 through line 45 and valve 46 and may, when desired, also be included in the polymerization stock.

Instead of, or in conjunction with the return of condensate from accumulator 37 to stabilizer 24, any other suitable means of cooling the gaseous products in the upper portion of this zone to the desired temperature may be employed. As an example of other suitable means of accomplishing the desired cooling in the upper portion of the stabilizer, a closed coil 47 may be provided therein through which a suitable cooling medium is circulated by means of lines 48 and 50 containing the respective valves 49 and 51.

The distillate which has been stabilized to the desired vapor pressure is directed from the lower portion of stabilizer 24 through line 52 and valve 53 to pump 54 and supplied therefrom, in the case here illustrated, through line 55 and valve 56 to heat exchanger 21, wherein it passes, as previously mentioned, in indirect heat exchange with the distillate being supplied to the stabilizer and serves to reheat the latter and partially cool the stabilized distillate. The partially cooled stabilized distillate is directed from heat exchanger 21 through line 57 and valve 58, preferably to and through cooler 59, wherein its temperature is further reduced to the desired degree and wherefrom it is withdrawn, in part, from the system to storage or to any desired further treatment through line 60 and valve 61. However, in the present invention, regulated quantities of the stabilized and cooled distillate is passed from line 60 through line 62 wherefrom this material may be directed, all or in part, through valve 63 into the upper portion of fractionator 3 or through line 64 and valve 65 into line 8 to commingle therein with the fractionated vapors and gases passing therethrough to condenser 10 or it may be directed, all or in part, through line 66 and valve 67 into line 11 to commingle therein with the stream of distillate and gases passing from condenser 10 to receiver 13.

Preferably, as previously mentioned, the stabilized distillate which is recirculated to serve as an absorption medium for the heavy normally gaseous products of the process is returned to fractionator 3, since, with this method of operation, it also functions as a cooling and refluxing medium in the fractionator. However, in case the stabilized distillate is not returned to the fractionator, but instead is commingled with the fractionated vapors either prior to, during or following the condensation step, or in case the quantity of stabilized distillate required to obtain the desired absorption of high-boiling gases and returned to fractionator 3 is not sufficient to obtain the desired cooling in the upper portion of this zone, unstabilized distillate from receiver 13 may be returned to the fractionator through line 68 and valve 69 in sufficient quantities to obtain the required cooling in this zone, or any other well known means of accomplishing cooling in the upper portion of fractionator 3, may be employed.

The preferred operating conditions which may be employed in apparatus such as illustrated and above described is approximately as follows: The fractionating column may employ a superatmospheric pressure ranging, for example, from 75 to 150 pounds or more per square inch and a top temperature of from 370 to 425° F. The stabilizer preferably employs a superatmospheric pressure of from 150 to 200 pounds or more per square inch with a top temperature ranging, for example, from 130 to 145° F.

As a specific example of the operation of the process of the invention, fractionated vapors derived from cracking a 25° A. P. I. gravity Mid-Continent topped crude are withdrawn from the upper portion of fractionating column 3 which is operated at a superatmospheric pressure of about 75 pounds per square inch and a top temperature of 370° F. The fractionated vapors are subjected to condensation and cooling in condenser 10 and the resulting distillate is separated from uncondensed and undissolved gases in receiver 13. The undissolved and uncondensed gases collected are discharged from the upper portion of the receiver and from the system. The gas-containing distillate is reheated by indirect heat exchange, as shown in the drawing, and supplied to stabilizer 24 which, in this particular case, is operated at a superatmospheric pressure of approximately 175 pounds per square inch with a top temperature of about 140° F. The liberated gases, comprising principally $C_3$, $C_4$ and some lighter gases, are withdrawn from the upper portion of the stabilizer and subjected to cooling and condensation in condenser 30. The resulting condensate and uncondensed light gases are collected and separated in accumulator 37. The uncondensed gases collected in the accumulator are removed from the system and a portion of the normally gaseous condensate is returned from the accumulator to the upper portion of the stabilizer as a refluxing and cooling medium, the remaining portion being recovered for use, for example, as polymerization stock. Stabilized distillate of about 10 pounds Reid vapor pressure is withdrawn from the lower portion of the stabilizer, subjected to cooling, and a regulated quantity of the cooled distillate is returned to the upper portion of fractionator 3 to serve as a refluxing and cooling medium therein and as an absorbent for heavy gaseous components of the overhead stream with which it is supplied from fractionator 3, through condenser 10 to receiver 13. The remaining portion of the stabilized distillate is recovered as the final gasoline product of the process.

In the table that follows a comparison is made between the results obtained in an operation such as described above and those obtained in a similar but conventional operation not employing the novel feature of returning regulated quantities of the stabilized distillate to the fractionator.

| | Conventional operation | Applicant's operation |
|---|---|---|
| Fractionated vapors___barrels per day__ | 579 | 579 |
| Receiver gas_____do____ | 111 | 75 |
| Stabilizer charge_____do____ | 468 | 504 |
| Stabilizer overhead_____do____ | 97 | 133 |
| Stabilized distillate_____do____ | 371 | 371 |
| Stabilizer gas composition, percent (approximate): | | |
| $CH_4$ | 6.8 | 4.5 |
| $C_2H_4$ | 4.5 | 3.0 |
| $C_2H_6$ | 8.5 | 5.7 |
| $C_3H_6$ | 24.1 | 26.1 |
| $C_3H_8$ | 39.1 | 39.4 |
| $iC_4H_8$ | 2.2 | 2.7 |
| $nC_4H_8$ | 4.5 | 6.5 |
| $C_4H_{10}$ | 8.2 | 10.0 |
| $C_5H_{12}$ | 2.1 | 2.1 |
| | 100.0 | 100.0 |

We claim as our invention:

1. A process of the character described, which comprises fractionating vaporous products resulting from the cracking of hydrocarbon oils to condense their components boiling above the range of normally gaseous products and gasoline, condensing the fractionated vapors under conditions regulated to retain substantially all of the 4-carbon atom gases and at least a substantial quantity of the 3-carbon atom gases in the distillate, separating the latter from the remaining undissolved and uncondensed normally gaseous products and withdrawing the last-named products from the process, stabilizing the separated distillate to reduce its vapor pressure to the desired degree by liberating therefrom regulated quantities of dissolved normally gaseous products which contain a high percentage of readily polymerizable olefins, such as propene and butenes, recovering the liberated gases, separately recovering a portion of the stabilized distillate, and returning another portion thereof to the fractionating step at a point adjacent the point of removal of the fractionated vapors and gases therefrom.

2. A process of the character described, which comprises fractionating vaporous products resulting from the cracking conversion of hydrocarbon oils to condense their components boiling above the range of normally gaseous products and gasoline, condensing the fractionated vapors under conditions regulated to retain substantially all of the 4-carbon atom gases and at least a substantial quantity of the 3-carbon atom gases in the distillate, separating the latter from the remaining undissolved and uncondensed normally gaseous products and withdrawing the last-named products from the process, stabilizing the separated distillate to reduce its vapor pressure to the desired degree by liberating therefrom regulated quantities of dissolved normally gaseous products which contain a high percentage of readily polymerizable olefins, such as propene and butenes, recovering the liberated gases, separately recovering a portion of the stabilized distillate, and cooling and returning another portion thereof to the fractionating step at a point adjacent the point of removal of the fractionated vapors and gases therefrom.

3. A process of the character described, which comprises fractionating vaporous products resulting from the cracking of hydrocarbon oils to condense their components boiling above the range of normally gaseous products and gasoline, condensing the fractionated vapors under conditions regulated to retain substantially all of the 4-carbon atom gases and at least a substantial quantity of the 3-carbon atom gases in the distillate, separating the latter from the remaining undissolved and uncondensed normally gaseous products and withdrawing the last-named products from the process, separately removing the distillate from the zone of said separation, reheating and substantially revaporizing the distillate and introducing the same into a stabilizing zone wherein its vapor pressure is reduced to the desired degree by liberating therefrom regulated quantities of its dissolved normally gaseous components which contain a higher percentage of readily polymerizable olefins, such as propene and butenes, removing the liberated gases from the stabilizing zone and recovering the same, heating the components of the distillate which remain unvaporized in the stabilizing zone to reboil the same, passing resulting hot stabilized and reboiled distillate in indirect heat exchange with the unstabilized distillate being supplied to the stabilizing zone, whereby to effect said reheating and substantial vaporization of the latter and partially cool the former, subsequently further cooling the stabilized distillate, thence recovering a regulated quantity thereof, and returning another regulated quantity of the same to the fractionating step at a point adjacent the point of removal of the fractionated vapors and gases therefrom.

4. A process for recovering a normally gaseous fraction rich in polymerizable olefins from the mixture of vapors and gases produced in the conversion of hydrocarbons, which comprises fractionating said mixture in a fractionating column to condense and separate fractions thereof heavier than gasoline from the gasoline vapors and gases, subjecting the fractionated mixture to final condensation under conditions adequate to liquefy the gasoline vapors and $C_4$ components of the gases, separating the resultant condensate from the lighter uncondensed gases and withdrawing the latter from the process, stabilizing the separated condensate to liberate $C_4$ hydrocarbons therefrom and recovering the thus liberated normally gaseous hydrocarbons, and introducing a portion of the stabilized condensate into the upper portion of said fractionating column to contact with said mixture undergoing fractionation.

CLARENCE G. GERHOLD.
BERNARD J. FLOCK.